(12) United States Patent
van Harderveld et al.

(10) Patent No.: US 6,214,305 B1
(45) Date of Patent: Apr. 10, 2001

(54) METHOD AND APPARATUS FOR THE TREATMENT OF DIESEL EXHAUST GAS

(75) Inventors: Ruud van Harderveld, Beek; Michiel Makkee, Rockanje; Jacob Adriaan Moulijn; Sietze Jelle Jelles, both of Den Haag, all of (NL)

(73) Assignees: Technische Universiteit Delft; Stichting Voor de Technische Wetenschappen, both of (NL)

( * ) Notice: Subject to any disclaimer, the term of this patent is extended or adjusted under 35 U.S.C. 154(b) by 0 days.

(21) Appl. No.: 09/091,475

(22) PCT Filed: Dec. 20, 1996

(86) PCT No.: PCT/NL96/00496

§ 371 Date: Aug. 26, 1998

§ 102(e) Date: Aug. 26, 1998

(87) PCT Pub. No.: WO97/23268

PCT Pub. Date: Jul. 3, 1997

(30) Foreign Application Priority Data

Dec. 21, 1995 (NL) ................................................ 1001962

(51) Int. Cl.$^7$ .............................. B01D 53/92; B01D 53/94
(52) U.S. Cl. .................. 423/212; 423/210.5; 423/213.2; 423/213.5; 423/245.3; 422/177; 422/176
(58) Field of Search ............................. 423/210.5, 213.2, 423/212 C, 215.5, 245.3, 213.5; 422/177, 176

(56) References Cited

U.S. PATENT DOCUMENTS 3,647,358  3/1972  Greenberg ................................. 23/2 R
3,817,715 * 6/1974  Grantham .......................... 423/210.5
4,515,758  5/1985  Domesle et al. ................... 423/213.2

FOREIGN PATENT DOCUMENTS

| 1 156 353 | 10/1963 | (DE) . |
| 0 369 163 A1 | 5/1990 | (EP) . |
| 59-112818A * | 6/1984 | (JP) ................................. 423/215.5 |
| 04 011 913 | 1/1992 | (JP) . |
| WO 90/12646 * | 11/1990 | (WO) ................................ 423/245.3 |
| WO 93/15822 | 8/1993 | (WO) . |
| WO 95/28217 | 10/1995 | (WO) . |

* cited by examiner

Primary Examiner—Steven P. Griffin
Assistant Examiner—Timothy C Vanoy
(74) Attorney, Agent, or Firm—Michaelson & Wallace; Peter L. Michaelson; Edward M. Fink

(57) ABSTRACT

A method and apparatus for the oxidation of liquid or solid contaminants in the exhaust gas from diesel engines is provided. The process is conducted by passing the contaminated diesel engine exhaust gas through a turbulent gas flow, particulate separator, wherein this separator contains a plurality of separate and serially-arranged vertical plates arranged so that there is no net gas flow in the space between two adjacent vertical plates. The plates contain a catalytically active surface of (i) a mixture of metal salts and/or metals oxides, such as a mixture of the oxides of vanadium, molybdenum and alkali metals, which may be in a molten state at the operating temperature of the separator and (ii) one or more catalytically active metal or metal compounds to promote the oxidation of soot, such as metals or metal compounds of iron, platinum and palladium.

10 Claims, 4 Drawing Sheets

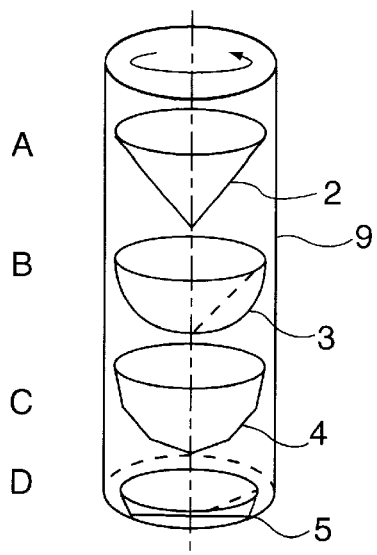
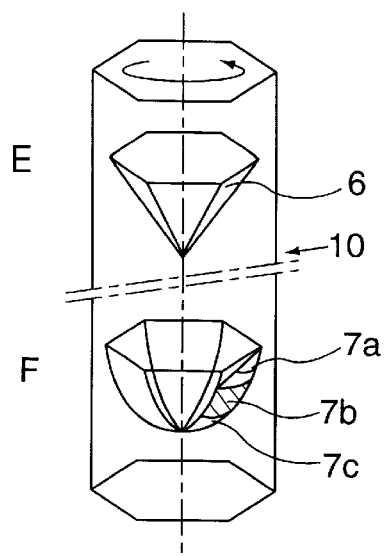
FIG. 2A    FIG. 2B
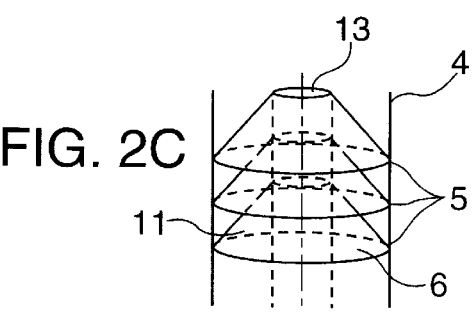
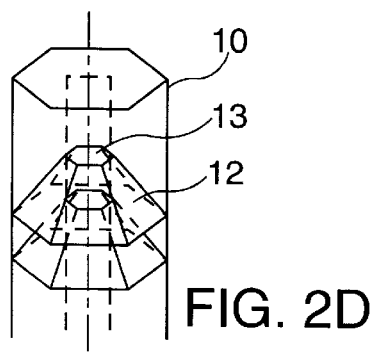
FIG. 2C    FIG. 2D
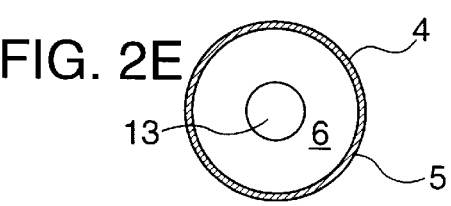
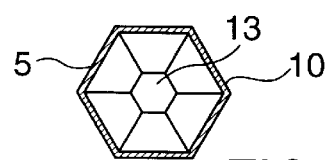
FIG. 2E    FIG. 2F
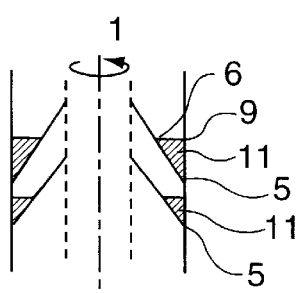
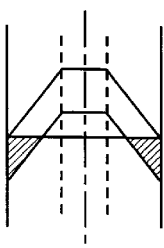
FIG. 3A    FIG. 3B

METHOD AND APPARATUS FOR THE TREATMENT OF DIESEL EXHAUST GAS

The invention relates to a method for the oxidation of carbon- and/or hydrocarbon- and/or organic compounds containing liquid or solid particulate contaminants in gas streams, more in particular on the diminishing, or the prevention of soot emission from diesel engines, comprising the treatment of the soot containing exhaust gasses prior to their emission to the open air.

Emission of gas streams which are contaminated with soot particles or with particles of solid or liquid hydrocarbon or organic compounds (for example oil or fat droplets) to the atmosphere is undesirable. This problem can be found in many places, such as in the oil processing industry and the like. It is known also that diesel engines show the disadvantage of a relatively high emission of soot particles. These soot particles have a negative influence on the environment and much research has been done already into the diminishing of the soot emission of diesel engines. A first possibility is to operate the engine at such conditions that the soot formation diminishes. In general this can be done at the expense of the capacity, the power and the fuel expenditure of the engine. An other possibility is the removal of the soot particles that are formed from the exhaust gasses.

However, in this last case one meets the difficulty that it is not easy to collect and to convert the often very fine particles.

The present invention aims at providing a method to diminish or even prevent the emission of such pollutants, by separating the solid or liquid particles from the exhaust gasses and by burning these after their separation through application of a non-selective oxidation catalyst (combustion catalyst) in the separator.

Therefor the invention relates to a method for the oxidation of carbon- and/or hydrocarbon- and/or organic compounds containing liquid or solid particulate contaminants in gas streams, comprising the treatment of said gas streams in a turbulent flow precipitator, of which at least part of the surface area shows catalytic activity for non-selective oxidation.

More in particular the invention relates to a method for the diminishing, or the prevention of soot emission of diesel engines, comprising the treatment of soot containing exhaust gasses prior to their emission in the open air in a turbulent flow precipitator, of which at least part or the surface area shows catalytic activity for non-selective oxidation.

The invention is based on the application or the principle of a specific separation system for the separation of very fine particles from gas streams, a 'Turbulent Flow Precipitator', as described for instance in the International patent application WO-A 93/15822, in combination with a catalytic combustion of the captured (soot) particles.

The separation is based on the phenomenon that a turbulent gas stream in a space, near to the walls of this space shows a zone of decreasing turbulence, known as the viscous border zone. In this zone particles can be captured and removed. According to the method described in said International patent application one obtains separation of particles of a dimension of 0.01 to 100 micrometer in a separator bat passing the turbulent as stream over a series of vertical plates, which form a number of vertical spaces with a chink (slit) form, which are in direct contact with the space in which the turbulent gas stream is contained.

The present invention is based on the insight that, it is possible to oxidize the mostly organic or soot particles, by bringing these in contact with a combustion catalyst (a non-selective oxidation catalyst) in said separation spaces of a slit (chink) form. It is known that for a good oxidation a good contact is necessary between the particles and the catalytically active material. In a separator of said type one obtains such a said good contact, especially if use is made of a preferred design of the separator and a preferred composition of the catalysts to be described later on.

According to the invention one takes care that in the separating spaces (slits/chinks), that is to say in the zone in which the main gas stream is not conveyed, a combustion catalyst is present. Herewith it is of importance that catalytically active surfaces are present in said slits/chinks. This surface can be provided by the surface of the plates, or as a packing in the slits/chinks.

The surface can already be catalytically active from origin or can be made active through the nature or the construction material of the plates or the packing (for instance copper). However, it is also possible to provide the catalytic activity by the application of a catalytically active material on said surface, for example as a wash coat.

Preferably the separator is provided with a packing, which exists of a metallic or ceramic support material, of which the surface already shows or gains catalytical activity for non-selective oxidation.

According to a preferred method of the invention one doesn't apply the design described above, but an improved design which is described in the Dutch patent application Nl 10-01963 of the same date. In this application an apparatus is described, which consists of at least a housing provided with an entrance duct for the gas stream to be purified on the one side (end) and a discharge (exit) duct for the purified gas stream on the other side (end), as well as at least one predominantly vertically placed convey channel for said gas stream, at which said apparatus is provided with means for the separation of the particles from said gas stream, which means are bounded to the convey channel, are in direct contact therewith and consist of a number of plates which are directed at an angle smaller than 90 degrees with the convey axis and where again and again two plates form a chink (crevice, slit), which is fit for separating and discharging the particles.

The conveying of the gas takes place either in upward or in downward direction, at which it is also possible to connect two or more vertically mounted pipe parts by bends of about 180 degrees, which shows as advantage that the system needs less height.

With a system as described above an optimal separation of the particles is obtained, while simple combustion of these particles is also possible, for instance by providing the surface of the plates, on which the particles fall, with a combustion catalyst. An other possibility is the application of a packing material consisting of a predominantly inert material, for instance a metal or a ceramic material, on the surface of which a catalytically active material is applied, or a packing material which itself shows catalytic activity. Under the influence of the gravitational force, or by mechanical vibrations, for instance resulting from the engine of a diesel vehicle, the particles will always move downward, so that the contact between the particles and the catalytically active surface is warranted almost always. It is known that in existing systems for the removal and combustion of soot from exhaust gasses the warranty of this contact is problematic.

The contact between the separated soot and the catalyst is an essential condition for a good combustion of the capured soot. This is decribed, among others, in publications of J.P.A. Neeft et al. In these references it is described that a good contact between the soot and the catalyst, as is obtained for instance by mixing of soot and catalyst in a ball mill, results in an appreciably (up to 200° C.) lower temperature of combustion than in case of bad contact as this results from mixing of soot and catalyst by shaking. Experiments, in which the combustion temperature was determined for soot, emitted by a diesel engine and captured on a ceramic filter provided with a layer of combustion catalyst, it was found that this temperature almost coincides with the combustion temperatures in case of bad contact.

As a packing material one can use almost any material that is resistant to the conditions prevailing at the oxidation. Examples are various kinds of fibres, (ceramic, metallic, glass), catalysts support particles, metallic and ceramic packings, or metallic and ceramic monoliths.

Due to the temperature of the exhaust gasses the separator automatically gets the temperature necessary for combustion, whilst the composition of the exhaust gasses can be chosen or adapted problemless in such a way that sufficient oxygen is present for the combustion. Using gas streams of other origins one has evidently to provide for the correct temperature and for sufficient oxygen.

As catalytic materials use is made preferably of materials which are known as combustion catalysts (non-selective oxidation catalysts) like copper, vanadium, chromium, manganese, molybdenum, platinum, palladium, tungsten, iron, cobalt, silver, alkali metals, earth alkali metals, cerium, lanthanum, lead, nickel as well as combinations and/or compounds thereof. The application of the catalytic surface can be Performed in known ways, at which more in particular attention can be given to a washcoat, precipitation, impregnation, but also to vacuum or electrolytic deposition of a metal, purposely followed by conversion into the catalytically active form.

The catalytically active material preferably consists of a mixture of metal salts and/or oxides and/or compounds which at the working temperature of the convertor, i.e. generally at T>250–300° C., are totally or partially molten, depending on the working conditions of the diesel engine and of the insulation measures taken for the exhaust system and the convertor. The captured soot particles are wetted by the melt. In this way a continuous and optimal contact of the catalyst and the soot particals to be combusted is obtained, guaranteeing an optimal combustion (conversion,) and combustion velocity of the soot. The absolute necessity of the physical contact between the soot particals and the active catalytic material in the catalyst particles for the oxidation of the soot is described, among others, in the publication of J.P.A. Neeft et al. mentioned above.

If no particular measures are taken to maintain this contact during the progress of the oxidation reaction the oxidation velocity can decrease because the contact surface area between the soot and the catalytically active material diminishes by the oxidation reaction or ceases completely.

Mixtures which are completely or partially molten at the said low temperatures are for instance mixtures of the oxides of molybdenum, vanadium and alkalimetals. Another mixture is for instance based on boric acid and boric oxide. To said mixtures additional metals and/or metal ions can be added to enhance the rate of oxidation or the soot and the transfer of oxygen from the gas phase to the melt and/or from the melt to the soot particles. Here one can think of the addition of copper, platinum, palladium, tungsten, chromium, manganese, iron, cobalt, nickel, lead, silver, cerium, lanthanum, and rare earth metals, as well as of combinations and/or compounds thereof, but the listing is not restricted to this.

The melting point of a number of interesting low melting mixtures of alkali/molybdenum/vanadium oxides and of boric acid/boric oxide, as listed for instance in "Gmelin's Handbuch der Anorganische Chemie", is given as an example in the table 1, but is not restricted to this.

TABEL 1

| | mole % | | mole % | T (Eutect) ° C. |
|---|---|---|---|---|
| $CsVO_3$ | 75.5 | $MoO_3$ | 24.5 | 362 |
| $KVO_3$ | 85.0 | $MoO_3$ | 15.0 | 420 |
| $V_2O_5$ | 51.0 | $Cs_2MoO_4$ | 49.0 | 352 |
| $Cr_2(MoO_4)_3$ | 10 | $Cs_2MoO_4$ | 90 | 400 |
| $Ag_2O$ | 63 | $V_2O_5$ | 37 | 386 |
| $B_2O_3$ $(H_2O)$ | | | | <400 |

The separation of soot takes places in the exhaust system of the diesel engine, where preferably the vertically mounted design is applied. However, in case that this is not allowed by the construction of the engine and/or the vehicle, one can also use a horizontally mounted system. In that case, the plates for the separation and the catalytic combustion are mounted preferably underneath the convey channel of the exhaust gasses. In that case, a possible design is a circular or elliptic pipe, which is provided with a gas convey channel at the upper side and further with predominantly vertically mounted separation plates in between which the combustion catalyst is applied.

An important aspect of the invention is the fact that according to the invention the mayor part of the separated solids is converted into gaseous compounds which are removed from the system together with the exhaust gasses. In general it is preferred that a means is present for the removal of ash rests resulting from the combustion of the soot.

In the system turbulence is obtained and maintained by a combination of velocity (generally >5 m/s) and diameter (hydraulic diameter) of the convey channel. Preferably the gas stream is turbulent already at the entrance of the apparatus thus making additional measures unnecessary. Only when the parameters which determine the turbulence (velocity, diameter, density, viscosity) change during the transit it can be necessary to take additional measures to maintain or enhance the extent of turbulence. Said measures are among others the installation of plates which restrict the transit area.

Generally one can say that sufficient separation can be obtained if one takes care that the Reynolds number in the centre of the convey channel is larger than 2000.

As a result of the decreasing turbulence near the wall of the convey channel the particles collect there and they will be captured in between the downwardly pointing plates, where their conversion into $CO_2$ and eventually $H_2O$ takes place with the aid of the catalytically active material and oxygen.

It is of importance that the sloping plates are mounted in such a way that the solid material, through a correct choice of the angle of the plates with the horizontal, makes contact with the catalytically active surface through the action of gravity.

The invention relates also to a(n) apparatus/means which is fit for the execution of the method, which means consists of at least a housing provided with an entrance duct for the (exhaust) gasses to be cleaned on the one side (end) and a discharge (exit) duct for the purified gasses on the other side (end), as well as at least one convey channel for said (exhaust) gasses, in which said apparatus/means is provided with means for the separation of the particles from said (exhaust) gasses, which means are bounded to the convey channel(s), are in direct contact therewith and consist of a number of Plates, where again and again typo plates form a chink (crevice, slit) in between each other, forming a zone in which no net gas flow occurs, which zone is fit for catching (capturing) and discharging particles contained in the (exhaust) gasses, where in said zone a catalytically active surface is present for the non-selective oxidation of the particles (soot).

The invention will now be more fully understood by reference to the drawing wherein.

Figure 1A:
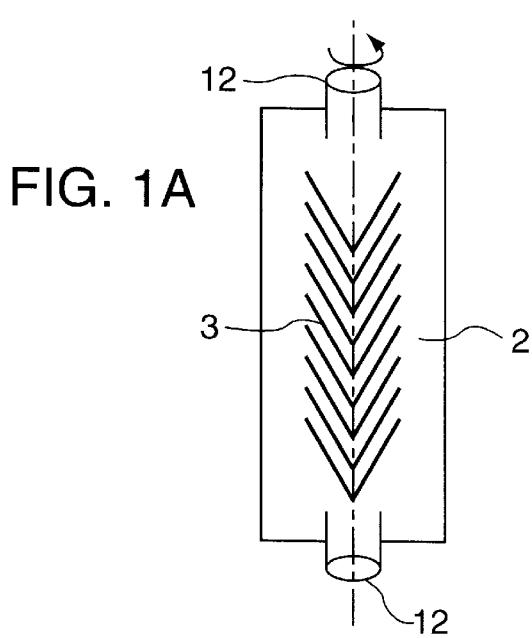
FIG. 1A is a front elevational view of a vertically mounted apparatus in accordance with the present invention.
Figure 1B:
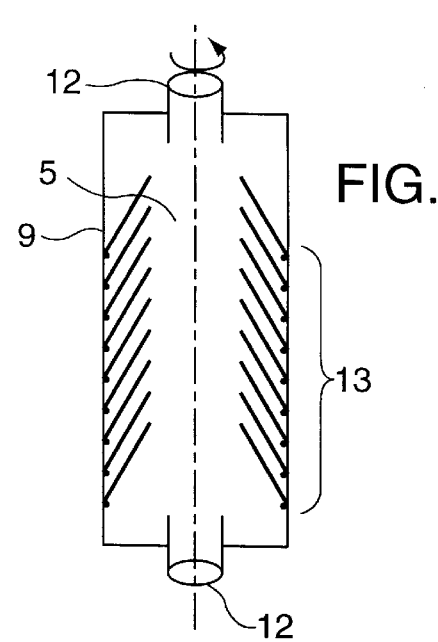
FIG. 1B is a front elevational view of an alternative vertically mounted apparatus in accordance with the present invention.
Figure 1C:
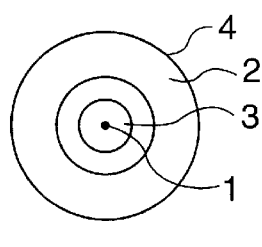
FIG. 1C is a plan view of the apparatus of FIG. 1A.
Figure 1D:
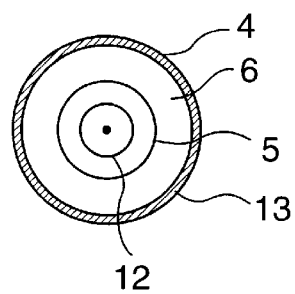
FIG. 1D is a plan view of the apparatus of FIG. 1B.
Figure 4A:
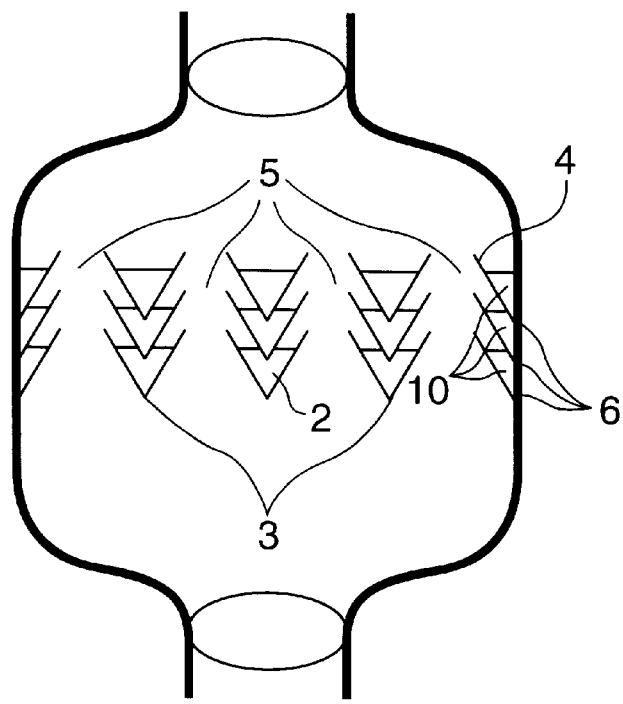
Figure 4B:
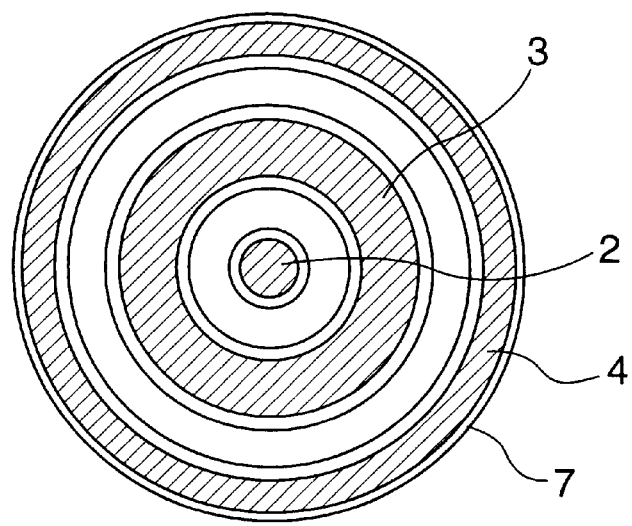

FIG. 2A is a front elevational view of the apparatus of FIG. 1A showing 4 alternative dish or plate arrangements suitable for use wherein the plates are obtained by revolving various lines around the axis of symmetry wherein a straight line is revolved around the axis of symmetry, a bent line is revolved around the axis of symmetry, a broken line is revolved around the axis of symmetry and an alternative broken line is revolved around the axis of symmetry;

FIG. 2B is a front elevational view of the apparatus of FIG. 1A showing additional dish or plate arrangements wherein a revolved body possesses an N-fold axis of symmetry or in which a revolved body possesses an alternative N-fold axis of symmetry;

FIG. 2C is a front elevational view, in perspective, of the apparatus of FIG. 1A showing an alternative dish or plate arrangement wherein the plates are revolved around a broken line;

FIG. 2D is a front elevational view, in perspective, of the apparatus of FIG. 1A showing an alternative dish or plate arrangement wherein the plates are revolved around the broken line;

FIG. 2E is a plan view of the apparatus of FIG. 1B showing topped cone shaped bodies which serve as plates in a pipe shaped housing in accordance with the invention;

FIG. 2F is a plan view of an alternative apparatus of FIG. 1B showing a cone structure having an N-fold symmetry axis in accordance with the invention;

FIG. 3A is a front elevational view of the apparatus shown in FIG. 2E;

FIG. 3B is a front elevational view of the apparatus shown in FIG. 2F;

With reference now more particularly to FIG. 1 there are shown schematic representations of three;

FIG. 4A is a front elevational view of a concentric multichannel apparatus in accordance with the invention;

FIG. 4B is a plan view of the apparatus of FIG. 4A; and

Figure 5:
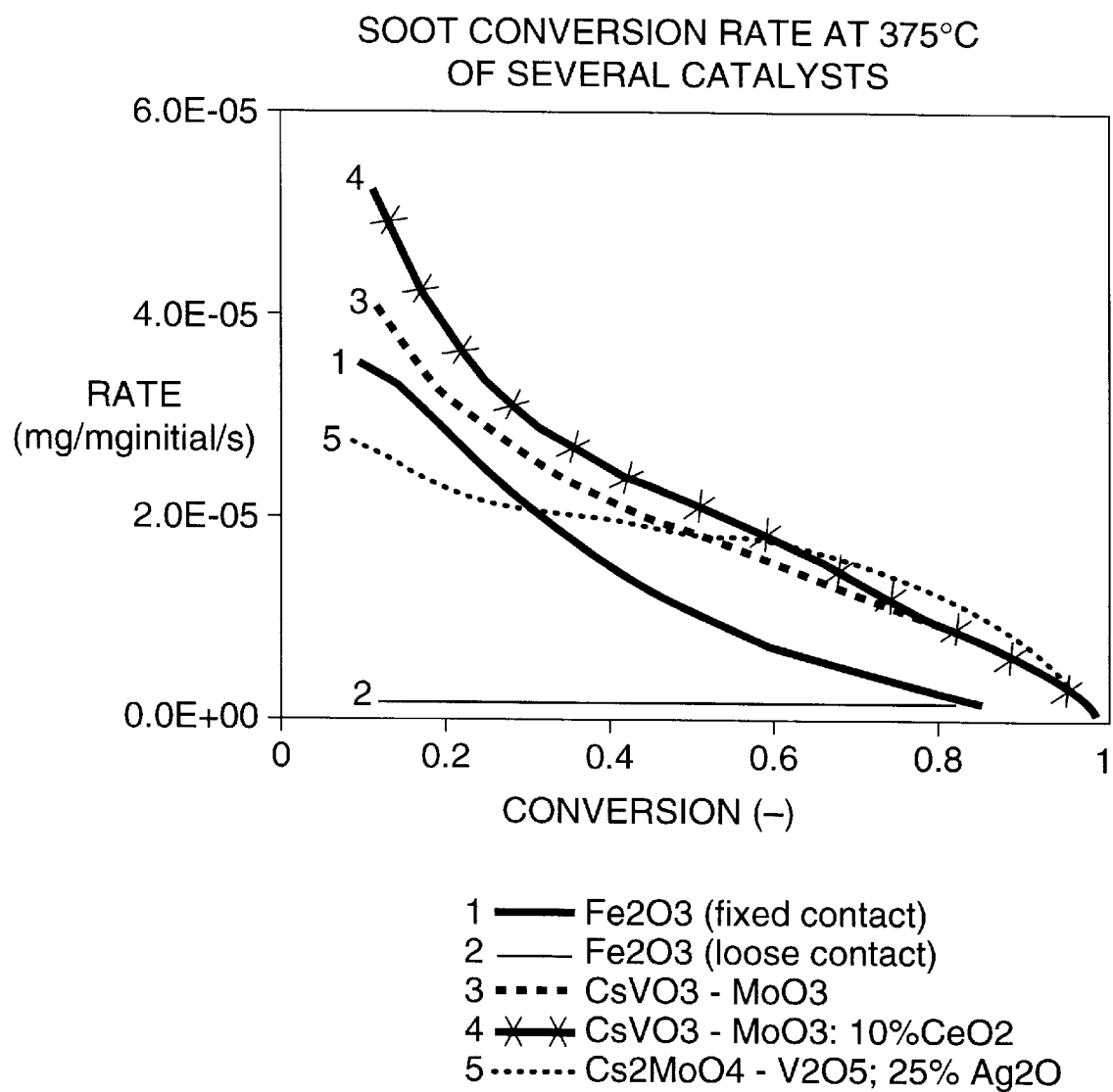

FIG. 5 is a graphical representation on coordinates of per cent conversion against rate of conversion in mg./initial mg/sec. showing soot conversion at 375° C. for different catalysts.

In FIG. 1A and 1B (1) is the, predominantly vertical, axis of symmetry of the revolved body, the cone with a circular ground plane or a regular polyhedron with a three or more fold symmetry around this axis, as indicated in FIG. 2.

The annular channel (2) that is formed between the housing (4) and the stacking of plates (cones) (3) in FIG. 1A serves as channel for the conveying of the exhaust gasses which can flow either upwardly or downwardly. The direction of flow of the exhaust gasses through the central channel (5) which is formed by the periferical cones (plates) (6) in FIG. 1B can be chosen freely as well. In FIG. 1B the housing (4) and the cones (6) fit seamless to each other by seam (packing) (13) so that no bypass stream can occur in the (soot) particle collecting spaces (9).

Figure 1E:
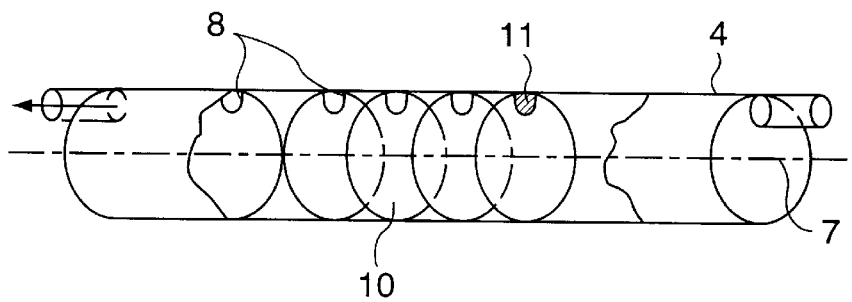
FIG. 1E is a front elevational view in perspective of a horizontally mounted apparatus in accordance with the present invention.
Figure 1F:
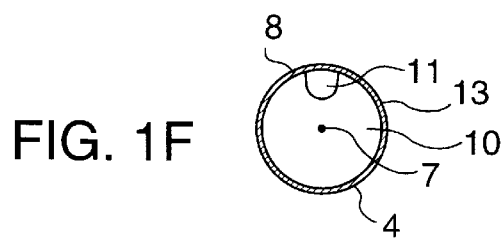
FIG. 1F is a side view of the apparatus of FIG. 1E.

In FIG. 1E the axis (7) of the housing (4) is predominantly in horizontal direction. The plates or dishes (10) are provided with holes (savings) (8) forming a channel (11) through which the exhaust gasses to be cleaned are conveyed. The plates (10) fit seamless to the housing (4) with the aid of seam (13) so that no bypass stream can occurs. The captured (soot) particles are collected in the (soot) collecting spaces (9) which are formed in between two consecutive plates and in which in some way material is present allowing for the catalytic oxidation of the (soot) particles.

The constructions are provided with an entrance and an exit duct (12), which may change their function depending on the direction of flow of the gas.

FIG. 2. alternative configurations (designated "A–F") are shown for the conical dishes or plates employed in the practice of the present invention. revolved bodies which may serve as plates (cones/dishes) in the apparatus shown in FIG. 1A. However, the shape of the plates is not restricted to these shown. In the FIG. 2A the plates are obtained by revolving a straight line (2), a bend line (3), and a broken line (4), and the broken line (5), respectively, around the axis of symmetry (1) on which the origin of these lines is situated, whilst in the FIG. 2B revolved bodies are drawn which possess an N-fold axis of symmetry, where in said drawing N is chosen equal to N=6.

In FIG. 2B (6) is one of the planes of the cone body, whereas in FIG. 2F the planes (7A), (7B) and (7C) are one of the composed side planes of the N-fold symmetrical body, where N is taken equal to N=6.

To obtain a regular flow of the exhaust gasses to be cleaned it is preferred that the (shape of the) cross section of the housing is the same as these of the cones. So, the housing (9) in the FIGS. 2A and, 2B is a pipe with a circular cross section of which the axis coincides with the axis of symmetry (1), whilst in FIGS. 3A and 3B the cross section of the pipe shaped housing (10) is a regular polygon with an N-fold symmetry, where in the figure N is chosen equal to N=6, and the axis of the pipe coincides with the N-fold axis of symmetry.

FIG. 3A shows topped cone shaped bodies (6) which serve as plates in the pipe shaped housing (4) of which the axis (1) coincides with the axis of symmetry of the cone bodies and where (5) are a dust and gas tight seams between the housing (4) and the plates (6). In between the upper side of the plates (6) and the housing (4) a space (9) is formed in which the captured particles collect and can continuously make contact with the catalytic material (11), which is present in that space, as a result of the gravitational force. The gas stream out of which the particles are separated can be conveyed through the channel (13) which is formed by the stacking of the topped cones (6). both in upward and in downward direction.

In FIG. 3B an identical situation is drawn for a cone body having an N-fold symmetry axis, where N is taken equal to N=6, and at which both the housing (10) and the plates (12) have a coinciding axis of symmetry (8); and seam (5) and (catalytic) packing (11) between the plates as well as gas conveying channel (13) have the same meaning as in the paragraph above.

In FIG. 4A and 4B around a central axis (4) the central plates (2) are arranged, the ring shaped plates (3) and the periferic plates (4), in between which the gas conveying ring shaped, channels (5) are formed through which the exhaust gasses to be cleaned can flow either in upward or downward direction. In between the housing (7) and the periferic plates (4) a dust and gas thight packing (6) is installed. The plates can be provided with a (catalytic) packing (11) to promote the capturing efficiency and the oxidation of the captured (soot) particles. The (exhaust) gas stream to be cleaned is let through the apparatus via the inlet and exit ducts (12) which can change their function, depending on the direction of flow of the gas through the apparatus.

A number of comparative experiments was performed showing the superior performance of catalytic systems which are at least partially molten at the temperature applied for the oxidation of the soot. To this end soot-catalyst mixtures were prepared by mixing in a ball mill to obtain good contact or in a tumble mixer to obtain poor contact. The mixtures obtained were put into a quartz glass reactor and enclosed in between inert beds of silicon carbide. In the catalyst bed a thermocouple was inserted to allow for the registration of the temperature during-the reaction. The reactors made up in that way were together put in a furnace where through each reactor was let a mixture of 10 vol % oxygen in argon, as a representative substitute for the about 10 vol % oxygen containing diesel exhausts. Then the temperature of the oven was set at a constant temperature, for instance 375° C., for 20 hours. The concentrations of CO and $CO_2$ present in the exhausts were continuously monitored with the aid of an infrared spectrometer. Based on this the conversion and the reaction velocity of the soot were calculated. The material balances showed to be within 5% in all cases.

Experiments were Done with the Following Catalysts

Catalyst 1.

$Fe_2O_3$, prepared by calcination of iron nitrate at 400° C. during 3 hours.

Catalyst 2.

$CsVO_3$—$MoO_3$, prepared by sintering a mixture of $Cs_2CO_3$ and $V_2O_5$ at 450° C. and subsequently melting at 600° C., after which the amount of $MoO_3$ is added which is needed to obtain the eutectic mixing ratio, and this mixture was heated again to a temperature 100° C. above the melting point. The mass obtained was broken and sieved after cooling.

Catalyst 3.

$CsVO_3$—$MoO_3$—$CeO_2$, prepared by the addition of 10% weight $CeO_2$ to the eutectic mixture of catalyst 2, melting, cooling, breaking and sieving.

Catalyst 4.

$Cs_2MoO_4$—$V_2O_5$—$Ag_2O$, prepared by heating of the eutectic mixture of $Cs_2MoO_4$—$V_2O_5$ after the addition of 25% weight of $Ag_2O$ to a temperature of 100° C. above the melting point. The $Cs_2MoO_3$ was prepared in advance by sintering of a stoechiometric mixture of Cs-carbonate and $MoO_3$ at 750° C. during 18 hours.

The following experiments (Table 2) were performed in which in each a mixture of 40 milligrams soot with an equal amount of catalyst was brought into the reactor.

TABLE 2

| Experiment | catalyst | contact |
|---|---|---|
| 1 | 1 | good (ball mill) |
| 2 | 1 | poor (tumble mixer) |
| 3 | 2 | poor |
| 4 | 3 | poor |
| 5 | 4 | poor |

The results are shown in the accompagnying FIG. 5. It appears clearly that catalyst 1 in poor contact with the soot (experiment 2) shows no measurable reaction whereas in case of good contact (experiment 1) a reasonably fast reaction occurs in the beginning, up to about 20% conversion, after which the reaction velocity decreases rapidly, till no longer measurable anymore at 80% conversion, as a result of the diminishing or ceasing of the contact between the soot and the catalyst.

The reaction velocities as measured for the catalysts 3, 4 and 5 as a function of the degree of conversion decrease gradually as a result of the decrease of the amount of soot present due to its oxidation. It is clear that a very high conversion of the soot is reached in all these cases at a very high reaction velocity, that is to say in relatively short times of reaction.

A comparison of the decrease of the reaction velocities for catalysts 3 and 4 in relation to the degree of conversion shows absolutely clearly that the addition of cerium oxide as promotor to the catalyst system has a very beneficial effect on the reaction velocity.

What is claimed is:

1. Method for the oxidation of liquid or solid particulate pollutants in diesel engine exhaust gas streams including carbon, hydrocarbons or combustible organics which comprises treating said gas streams in a turbulent flow precipitator including a housing having an entrance duct for gases to be treated at one end and a discharge duct for discharge of treated and cleansed gases at the opposite end, said housing comprising at least one substantially vertical conveyance channel for the exhaust stream, the center of said conveyance channel having a Reynolds number greater than 2000, and means for separating soot particles from the exhaust stream, said means being bound to the conveyance channel and which comprises a number of separate and serially-arranged plates, each of two adjacent plates forming a zone in which no net gas flow exists, said zone being suitable for trapping and removal of soot from the exhaust stream and containing a catalytically active surface for the non-selective oxidation of soot.

2. Method of claim 1, in which the means for separating comprises a support material containing surfaces having catalytic activity for non-selective oxidation.

3. Method of claim 2, in which the support material comprises an inert metal or ceramic material on which a catalytically active material is applied.

4. Method of claim 1, in which the catalytic activity of said catalytically active surface is provided by one or more metals and/or compounds selected from the group consisting of copper, vanadium, chromium, manganese, molybdenum, platinum, palladium, tungsten, iron, cobalt, silver, alkali-metals, earth-alkali-metals, cerium, lanthanum, lead, and nickel.

5. Method of claim 1, in which the gas streams in the separator are brought and/or are kept in turbulent flow by means of baffled channels, as a result of which the particles can be separated from said gas stream into said zone in which no net flow of gas exists.

6. Method of claim 1, in which the catalytically active surface is at least partially molten at the operating temperature of the separator.

7. Method of claim 1 wherein the catalytic activity is provided by a mixture the metals and/or compounds and/or oxides of vanadium, molybdenum and the alkaline and alkaline earth metals which may be partially molten at the operating temperature of the separator.

8. Method of claim 7, wherein the catalytic activity of the mixture is increased by the addition of promoters, which enhance the transfer of oxygen from the gas phase to the mixture and/or from the mixture to the material to be oxidized, at least one of said promoters is selected from the group consisting of copper, chromium, manganese, platinum, palladium, tungsten, iron, cobalt, nickel, lead, silver, cerium, lanthanum, rare earth metals and combinations and/or compounds therefor.

9. Method of claim 1, in which the catalytic activity is provided by a mixture of boric acid and boric oxide which is at least partially molten at the working temperature of the separator and at least one of the metals and/or compounds set forth in claim 5.

10. Apparatus for preventing or diminishing soot emission from exhaust gases from diesel engines comprising a housing having an entrance duct for the introduction of exhaust gases to be treated at one end and a discharge duct for the treated and cleansed exhaust gases at the other end, at least one substantially vertical conveyance channel disposed within said housing for said exhaust gases, said channel having disposed therein means for the separation of soot particles from the exhaust gases, said means being bonded to the conveyance channel and, said means comprising a number of separate and serially-arranged plates, each of two adjacent plates forming a zone in which no net gas flow exists, said zone catching and removing soot from the exhaust gases and being provided with a catalytically active surface for the non-selective oxidation of soot, said plates being positioned at an angle of less than 90 degrees with the axis of the conveyance channel.

* * * * *